United States Patent Office 3,072,632
Patented Jan. 8, 1963

3,072,632
ETHYLENE POLYMERIZATION WITH HIGH TEMPERATURE CATALYSTS
Hugh J. Hagemeyer, Jr., and Marvin B. Edwards, Longview, Tex., assignors to Eastman Kodak Company, Rochester, N.Y., a corporation of New Jersey
No Drawing. Filed Nov. 1, 1956, Ser. No. 619,671
11 Claims. (Cl. 260—94.9)

This invention relates to the polymerization of ethylene to solid polymer and is particularly concerned with the catalytic polymerization of ethylene at relatively low pressures to give solid high density polymer using a catalyst mixture of a new composition and which has been found to be highly active under certain specific conditions as described hereinafter.

For a number of years, ethylene has been polymerized to solid polymer of relatively low crystallinity and low density by means of very high pressure processes as described in Fawcett et al. 2,153,553 wherein pressures in excess of 500 atmospheres and usually of the order of 1000–2000 atmospheres have been employed to give solid waxy polymers which are characterized by extreme flexibility and a softening temperature of the order of 100° C.

More recently, the so-called high density polyethylene having an increased softening temperature, greater stiffness and greater crystallinity has been prepared by a number of catalytic processes, and this higher density material offers a means whereby more rigid articles can be molded or cast from polyethylene, which articles have a high softening temperature and are resistant to deformation by contact with boiling water. The catalytic mixtures which have become known to the art for forming the high density polyethylene generally fall into two main classes. One class involves the use of certain metal oxides in partially reduced form, such as partially reduced molybdenum oxide, in combination with an alkali metal compound as activator. The other class of catalysts usually consists of aluminum compounds which are used in conjunction with a transition metal compound. Usually, however, the aluminum compound employed is an organoaluminum compound such as aluminum triethyl or an alkyl aluminum halide such as ethyl aluminum sesquibromide.

The metal oxide catalysts must usually be used in the form of a supported catalyst and are subject to inactivation during use by deposition of polymer on the catalyst. The organoaluminum compounds are expensive to prepare and are extremely pyrophoric in nature and hence difficult to handle in commercial operations. Although a number of catalytic mixtures are known for polymerizing ethylene to solid polymer, the polymerization does not follow any regular pattern, and it has been difficult to postulate any theory to explain why particular combinations of materials give solid polyethylene whereas other combinations do not. Furthermore, some of the catalyst combinations have been useful only for polymerizing ethylene to solid polymer but not for polymerizing propylene and higher olefins to solid polymer whereas some catalysts are effective for both types of olefins. Furthermore, the compounds which can be used in combination vary widely and certain compounds which are quite effective in one combination are wholly ineffective in other combinations. This invention is concerned only with the polymerization of ethylene to solid polymer since most of the catalyst mixtures defined herein are not effective for polymerizing propylene and similar higher α-monoolefins to solid polymer. One specific catalyst combination which is within the scope of the present invention for polymerizing ethylene to solid polymer is also highly effective for polymerizing propylene and other higher olefins to solid polymer as disclosed and claimed in our copending application Serial No. 619,672 filed concurrently herewith.

It is an object of this invention to provide a new and improved method of polymerizing ethylene to solid polymer in good yield using a catalyst combination which has not been used heretofore for olefin polymerization.

Another object of the invention is to provide a new catalyst combination which is highly effective for polymerizing ethylene to solid polymer provided the catalyst mixture is activated by heating to a temperature of at least 150° C. either prior to or during the polymerization.

Another object of the invention is to provide a highly effective polymerization system for ethylene using a catalyst mixture which is effective within a temperature range which is above the effective temperature range of the usual organometallic catalysts.

Another object of the invention is to polymerize ethylene with a catalytic mixture consisting of simple and readily available components which can be effectively incorporated into large scale commercial production methods and which are not particularly difficult to handle in use and not readily inactivated by accidental contact with air or oxygen.

Other objects will be apparent from the description and claims which follow.

These and other objects of the invention are achieved as described more fully hereinafter by effecting the polymerization of ethylene at a pressure of at least 200 p.s.i. by catalysis with an activated catalytic mixture of an alkali metal and a hydrocarbon-soluble titanium compound in a mole ratio of the alkali metal to the titanium compound in the range of from 0.1:1 to 10:1, the catalytic mixture being activated by heating at a temperature of at least 150° C. The catalytic mixtures with which the present invention is concerned are unusual in that the individual components of the catalytic mixture are wholly ineffective for polymerizing ethylene when used individually and are also wholly ineffective when used in admixture unless the mixture of components is heated to a temperature of at least 150° C. either before or during the polymerization process. When activated at such elevated temperatures, the catalytic mixture is extremely active and gives high yields of polyethylene having a crystallinity of the order of 90% or higher, a specific gravity in excess of 0.95 and a softening point in excess of 120° C. The catalytic mixtures embodying this invention are unique not only in requiring the activation temperature as described but also in being particularly active at temperatures above 150° C. during the polymerization. This activity at elevated temperatures is in sharp contrast to the usual behavior of the ionic catalysts such as the aluminum compounds described in Belgian Patents 533,362 and 534,792 which are completely inactivated above about 110° C. The catalytic mixtures of this invention, if preactivated by heating at a temperature of at least 150° C. and preferably at least 190° C., can then be used for polymerizations at temperatures as low as 110° C. with temperatures of 110–250° C. being commonly employed. Optimum results are achieved when the polymerization is carried out at a temperature of at least 150° C. whereby no pre-activation is necessary since the elevated temperature of polymerization is sufficient to cause activation of the catalytic mixture in situ. The preferred range for the polymerization embodying this invention is 150–250° C. for optimum results.

In practicing the invention, any of the alkali metals can be used as one component of the catalytic mixture with sodium, potassium and lithium metal being preferred over the less active and less available cesium and rubidium. The alkali metal can be used in amounts as low as one-tenth the molar amount of the titanium compound, and as high as ten times the molar amount of the titanium compound. Ordinarily, it is preferable to employ the alkali metal in a ratio of at least 1:1 to the titanium compound for optimum results although lower concentrations can be employed, particularly when using the alkali metal in the form of a high surface dispersion as described hereinafter. The alkali metal can be used in any form and is usually used in the form of a powder or sand or other granular state whereby a homogeneous polymerization system can be obtained. We have found that particularly good results are achieved when the alkali metal is employed in the form of a high surface dispersion which can be readily obtained by slurrying the alkali metal in molten form with any inert support whereby the alkali metal spreads in a thin film over the surface of the support to give a very highly active catalyst component. When the high surface dispersions of this kind are employed, the alkali metal can amount to as much as 30% of the total weight of the alkali metal and support, although much lower concentrations of the alkali metal on the support are wholly suitable. The concentration of the alkali metal on the support and the nature of the support are not critical and can be varied widely. Since the support serves only to give the high surface area of alkali metal, any of the inert granular materials can be used including salts such as sodium chloride or similar salts which are not soluble in hydrocarbons, metal oxides such as titania, zirconia, alumina and the like, carbon black, silica alumina, clays, alumina silicates and similar well known inert particulate materials upon which the alkali metal can spread in thin film form. When such high surface dispersions of alkali metal are employed, the catalytic mixture, after activation, is particularly active, and the low mole ratios of alkali metal to titanium compound can be most effectively used. At temperatures above the melting points, the alkali metals spontaneously spread over such solids as described as well as such other suitable supports as metal powders, inert ceramic materials and the like to give alkali metal films having a film thickness varying from 1 to 5 atoms. Theoretically, 10% by weight of sodium must be absorbed by an activated alumina and 25% by weight of sodium must be absorbed by activated carbon before continuous monomolecular films can be formed. The effective surface area of the solid carrier or support governs the amount of alkali metal which can be absorbed. For example, sodium chloride will carry up to 10% alkali metal, activated alumina will carry 20–25% alkali metal, zirconia oxide will carry 10% alkali metal, activated carbon will carry 25–30% alkali metal and sand will carry 5% alkali metal. Within these concentrations, a free flowing solid is obtained while above these concentrations the mixtures become a pasty mass. These free flowing characteristics are exhibited by the high surface dispersions at temperatures up to the boiling point of the metal, that is, up to 883° C. for sodium. Thus, the high surface dispersions can contain any amount of the alkali metal which will spread over the support being used to give a free flowing solid. Although the high surface dispersions are preferred because of their enhanced activity, the unsupported alkali metal can be used with excellent results and is within the scope of the invention.

The alkali metal can be used in combination with any of the hydrocarbon-soluble titanium compounds, i.e. any of the titanium compounds which are soluble in such well known hydrocarbon solvents as the alkanes, benzene or benzene derivatives and similar well known hydrocarbons. Thus, the titanium compounds which are preferably used are the titanium tetrahalides such as titanium tetrachloride or titanium tetrabromide, but the titanium alkoxides such as titanium butoxide, 2-ethylhexyl titanate and similar titanium compounds can also be used. In the polymerization of ethylene, the titanium alkoxides give solid polymer when employed in conjunction with the alkali metal although the yield of polymer is lower than that obtained with the titanium tetrahalides which are preferred. Of the titanium compounds, titanium tetrachloride is desirably employed both from the standpoint of activity and availability.

The catalyst mixtures embodying the invention must be activated at a temperature of at least 150° C. in order to be effective for polymerizing ethylene. When the catalytic mixture is pre-activated, this can be simply accomplished by heating the catalytic mixture to a temperature of at least 150° C. and desirably 190–250° C. for periods of from a few minutes to several hours. If desired, the mixture can be first treated with hydrogen at elevated pressures and temperatures although the treatment with hydrogen is not necessary for good results. Even when treated with hydrogen, the catalytic mixture must still be heated to temperatures above 150° C. in order to exhibit catalytic activity. When the pre-activation as described is carried out, the catalyst can then be used at polymerization temperatures as low as 110° C. with good results, although optimum results are achieved by effecting the polymerization at temperatures of at least 150° C. When the polymerization itself is carried out at temperatures of at least 150° C., the pre-activation is unnecessary although preactivated catalyst can be used. There are several advantages to the high temperature characteristics of the catalysts of this invention. The polymerization is usually facilitated by elevated temperatures for which the present catalyst mixtures are completely suitable. In contrast to this, the organometallic catalysts such as the organoaluminum catalysts are completely inactive at temperatures above about 120° C. and usually above 110° C. For example, ethylaluminum sesquibromide and titanium tetrachloride in boiling toluene (110° C.) fails to polymerize ethylene whereas the catalysts of this invention polymerize ethylene in excellent yield at temperatures as high as 250° C. Because of the high temperature characteristics of the catalysts of this invention, little or no solvent is needed during the polymerization although the use of solvent may be desirable and is within the scope of the invention. Since the process is operable at temperatures well above the melting point of the polymer being formed, relatively concentrated solutions of the polymer can be handled. The molten polymer as well as the highly viscous polymer solutions do not inactivate the catalysts of this invention and consequently high space-time yields are possible. This is in contrast to the organoaluminum catalysts which are inoperable above the melting point of the polymer whereby slurries of polymer in solvent must be handled. Since the polymer at lower temperatures forms very viscous slurries in solvent, the polymerization using conventional catalysts is limited to those relatively dilute slurries which can be stirred and pumped. In addition, the catalyst mixtures of this invention are stable and require no special handling techniques. The components of the catalytic mixture are not highly pyrophoric and are not subject to rapid inactivation by air. The superior stability of the present catalyst mixtures to accidental inactivation permits precise control of the catalyst concentration. Furthermore, the alkali metals offer important cost advantages over the organoaluminum, organomagnesium or organozinc compounds as catalyst components A further advantage of the catalysts embodying this invention is that the formation of solid polymer is not accompanied by the concomitant formation of objectionable amounts of oils and greases which usually characterize many of the catalytic processes, and particularly those wherein aluminum in combined form is a component.

Although little or no solvent vehicle need be used in effecting the polymerization embodying the invention, the polymerization is conveniently carried out in an inert solvent. Suitable solvents include any of the well known inert organic liquid vehicles which are free of combined oxygen and which are also free of water, alcohol, ether or other compounds containing oxygen. Thus, suitable solvents include the aliphatic hydrocarbons such as propane, pentane, heptane, or similar alkanes, aromatic hydrocarbons such as benzene, toluene or xylene and halogenated hydrocarbons such as trichloroethylene or chlorobenzene. Petroleum fractions of suitable boiling range such as Stoddard solvent, kerosene or gasoline can also be used as well as the naphthalenes which are liquid at the polymerization temperature, decalin, tetralin or other well known inert liquid vehicles. Since the use or non-use of a liquid vehicle is not critical to the practice of the invention, the concentration of catalyst and ethylene monomer in the solvent can be varied over a wide range. For example, the concentration of catalyst in the solvent is preferably in the range of 10–25% by weight, but higher or lower concentrations can be used and, in fact, the solvent can be dispensed with entirely. Furthermore, because of the very high temperatures which can be employed, the concentration of monomer in the solvent can be varied widely with concentrations of from about 2 to 50% by weight being wholly operable. Concentrations of monomer in the vehicle of about 3–7% by weight are commonly employed, although higher concentrations ordinarily increase the rate of polymerization and are sometimes desirably used. Concentrations above 5–10% by weight are entirely feasible at the high temperatures obtaining in this invention which is in contrast to the usual polymerization systems wherein a solvent medium is used at lower temperatures since the viscosity of the solution limits the concentration of monomer which can be employed.

The mole ratio of the alkali metal to the titanium compound can be varied within the range of from 0.1:1 to 10:1 depending upon the polymerization conditions. In general, the lower mole ratios of alkali metal are used when the polymerization is carried out at high temperatures of the order of 190–250° C. or when the catalyst mixture has been treated with hydrogen prior to activation. The larger mole ratios of alkali metal are used when polymerization is conducted at lower temperatures. For example, when 4 to 6 moles of alkali metal per mole of titanium compound are used, the optimum polymerization temperature is 150–160° C. When 2 to 3 moles of alkali metal per mole of titanium compound are used, the optimum polymerization temperature is 190–230° C.

The polymerization embodying the invention is ordinarily carried out at pressures of at least 200 p.s.i., which pressure is ordinarily accomplished by pressuring the polymerization system with the ethylene to be polymerized. Higher olefin pressures result in higher olefin concentrations in the reaction medium and thus serve to increase the rate of polymerization. Generally, pressures of 200–2000 p.s.i. are employed with pressures of 200–1000 p.s.i. being preferably used. Higher pressures can be employed although such higher pressures are usually not necessary.

The processes embodying this invention and employing the activated catalyst mixtures herein defined can be carried out either batchwise or continuously in accordance with usual practice. The molecular weight, melt index, softening point and other commercially important properties of the polyethylene product are dependent upon the polymerization temperature employed and upon the degree of conversion, that is, the weight of polymer synthesized per unit weight of catalyst. High conversions and lower temperatures favor formation of high molecular weight, low melt index polymer whereas low conversions and high temperatures favor formation of low molecular weight, higher melt index polymers. By control of the various variables, a wide range of polymeric products can be obtained with properties selected for the particular use to which the polymer is to be put. Catalyst can be removed from the polymeric product by washing with basic alcohol or acidic alcohol solutions. The washing of polymer from the product is facilitated by converting the polymer to powdered form. A suitable powder is readily obtained by dissolving the crude polymer in xylene-isobutanol solution and then cooling the solution slowly whereby the product is precipitated in powder form. The alcohol and xylene can be most readily removed from the polymer by steam distillation. Filtration of the hot polymer solution coming from the reactor is frequently an aid in preparing colorless polymer.

The solid polyethylene prepared in accordance with this invention is free of objectionable amounts of low molecular weight oils and greases and hence do not need to be fractionated prior to use. The polyethylene obtained according to the invention is highly crystalline and usually exhibits crystallinity above 85% and often above 90% as shown by X-ray diagrams. The number of methyl groups per hundred carbon atoms in the polyethylene of this invention is of the order of 0.5 or lower, which is in contrast to the low density polyethylene prepared by conventional high pressure processes. The density of the polymer is of the order of 0.945 or higher, with densities of the order of 0.96 or higher being obtained in most cases. The inherent viscosities as measured in tetralin at 145° C. can be varied from about 0.5 or lower to 5.0 or higher. Melt indices as measured by the standard ASTM method can be varied from about 0.01 to 20 or higher. Thus, polyethylene prepared by means of this invention and having a molecular weight in the range of 50,000 exhibits a density above 0.95, a softening temperature in the range of 125–130° C. or higher, a tensile strength of 3000–5500 p.s.i. and a stiffness in flexure at 5% deflection of at least 50,000 p.s.i. These improved results are obtained using any combination of an alkali metal with any of the titanium compounds which are soluble in ordinary hydrocarbon solvents. In particular, these improved results are obtained using either sodium, lithium or potassium as the alkali metal and titanium tetrachloride, titanium tetrabromide or a titanium tetraalkoxide wherein each alkoxy group contains 1–14 carbon atoms.

The invention is illustrated by the following examples of certain preferred embodiments thereof, although it will be understood that the examples are included for purposes of illustration and are not intended to limit the scope of the invention unless otherwise specifically indicated.

*Example 1*

A catalyst mixture composed of 5.36 g. (0.232 atom) of sodium metal and 22.1 g. (0.116 mol) of titanium tetrachloride was charged to an 1800-ml. autoclave and heated at 190° C. for one hour. The autoclave and contents were then cooled to 110° and contacted with ethylene at 800–900 p.s.i. pressure for 12 hours. The crude polyethylene was removed from the autoclave and washed free of adhering catalyst with hot methanolic hydrochloric acid. In order to remove catalyst embedded inside the polymer particles, the washed polymer was dissolved in hot xylene-2-ethylhexanol solution and reprecipitated by cooling. The reprecipitated polymer was then washed again with hot methanolic hydrochloric acid and dried. The polyethylene formed amounted to 50 grams, melt index, 0.01. Thin plates pressed from the polymer were exceptionally stiff and tough.

*Example 2*

In the preceding example, the catalyst mixture was preactivated and the polymerization carried out at a temperature below the temperature necessary for activation of catalyst. This pre-activation is not necessary when the polymerization is carried out at a temperature of at least 150° C. Thus, a catalyst mixture prepared from 10.7 g. (0.464 atom) of sodium and 44.1 g. (0.233 mole) of titanium chloride in 100 ml. of heptane was heated at 230° C. and then contacted with ethylene at 230° C. and 2500 p.s.i. for 18 hours. The resulting polyethylene weighed 17 g. after the product had been worked up by washing with a hot solution of nitric acid in methanol.

*Example 3*

A mixture of 5.36 g. of sodium metal and 22.1 g. of titanium tetrachloride in 100 ml. of xylene was reduced for 2.5 hours with hydrogen at 1000 p.s.i. and 100° C. The hydrogen was vented off and the catalyst mixture was then heated to 190° C. The reactor was pressured with ethylene to 1750 p.s.i. and maintained at 190° C. for 12 hours. After removal of residual catalyst, the resulting solid polyethylene weighed 33 g.

*Example 4*

An activated catalyst mixture was prepared by heating 10.72 g. of sodium metal and 22.1 g. of titanium tetrachloride in 100 ml. of xylene in an 1800 ml. autoclave at 190° C. for one hour. The reactor was then pressured with ethylene to 1000 p.s.i. and maintained at this pressure and at 190° C. for 12 hours. The product was freed of catalyst by washing with methanolic hydrochloric acid to give 82 g. of solid polyethylene.

When the process was repeated changing the mole ratio of alkali metal to titanium compound from 4:1 to 5:1, the yield of polyethylene was 73 g.

*Example 5*

Particularly good results are obtained using lithium metal as the alkali metal component. Thus an autoclave of 1800 ml. capacity was charged with 3.2 g. (0.465 atom) of lithium metal, 17.6 g. (0.925 mol) of titanium tetrachloride and 500 ml. of xylene. The autoclave was heated to 190° C. and ethylene was admitted until the pressure reached 1200 p.s.i. Polymerization was carried out at 190° C. under an ethylene pressure of 1200–1000 p.s.i. for 20 hours to give 120 g. of solid polyethylene.

*Example 6*

The titanium tetrahalides and particularly titanium tetrachloride are preferred for use as the titanium compounds in the catalyst mixture embodying the invention. As indicated, however, other titanium compounds can be used with somewhat less effective results. Thus a stirred autoclave of 3500 ml. capacity was charged with 3.2 g. of lithium sand, 47.5 g. of tetra-2-ethylhexyl titanate and 1000 ml. of xylene. This mixture was heated to 150° C. and contacted with ethylene at 1500–875 p.s.i. for 14 hours. At the end of the reaction period, the autoclave was cooled and emptied. The solid product was recovered by filtration and washed free of residual catalyst with hot methanolic hydrochloric acid and butanol containing 1% dissolved potassium hydroxide. The solid polyethylene thereby obtained weighed 25 g. and had a melting point of 123–140° C.

*Example 7*

A catalyst mixture of 7.8 g. of potassium metal and 7.6 g. of titanium tetrachloride in 250 ml. of xylene was charged to an 1800 ml. autoclave. The mixture was heated to 190° C. and the autoclave pressured with ethylene at 1200–800 p.s.i. for 8 hours. The crude polymer was washed with hot ethanol and dissolved in xylene. The xylene solution was filtered and cooled to recover the polymer and residual xylene was removed from the polymer by steam stripping. The polyethylene, after drying, weighed 94 g. and had a melt index of 0.22, a specific gravity of 0.955 and a Vicat softening point of 126° C.

*Example 8*

A high surface sodium suspension was prepared by charging 300 g. of previously dried gamma-alumina into a flask and displacing the air from the flask with dry nitrogen. A sweep-stirrer with a speed of 150–350 r.p.m. was adjusted to the desired speed and the slurry was heated to 150° C. Fifteen grams of sodium were added in small pieces and as soon as the sodium metal had melted the color changed from white to dull gray as the sodium spread over the gamma-alumina.

A catalyst mixture comprised of 46 grams of the above high surface sodium suspension (0.095 atom Na) and 6.3 grams (0.033 mole) of titanium tetrachloride was charged to an 1800-ml. autoclave. Heptane (500 ml.) was added and the mixture was heated to 190° C. Ethylene was pressured in at 1000 p.s.i. and the polymerization carried out for 6 hours. The crude polyethylene was removed from the autoclave, dissolved in hot xylene and filtered. After cooling the polyethylene precipitated from the xylene, was filtered and washed with hot methanolic hydrochloric acid, then with water and dried. The polyethylene formed amounted to 170 g., melt index, 0.01. Specific gravity, 0.962; Vicat softening point, 126° C.

*Example 9*

A 31.5-gram portion of the high surface sodium suspension prepared in Example 8 was placed in a nitrogen-blanketed 1800-ml. autoclave. Titanium tetrachloride, 6.3 g. (0.033 mol.) was added and the two-component mixture was heated to 230° C. Ethylene was pressured in at 1200 p.s.i. and the polymerization was carried out for 12 hours. Fresh ethylene was added as needed to restore the pressure to 1200 p.s.i. At the end of the polymerization, unreacted ethylene was vented from the autoclave and the molten polyethylene was poured out. The polymer weighed 448 g. A portion of the polymer was dissolved in hot decane and filtered under pressure to remove the gamma-alumina. The filtrate was cooled to precipitate the polyethylene. After separation from the decane solvent and drying, the polyethylene had these properties: melt index, 0.01; specific gravity, 0.965; Vicat softening point, 125.8° C.

Similarly improved results were obtained by replacing the sodium with an equivalent amount of lithium. The procedure employed was exactly the same as in the case of sodium except that the high surface dispersion of lithium on the alumina was prepared by heating the alumina and lithium at 210° C.

Thus by means of this invention, solid polyethylene is readily prepared using a catalyst mixture consisting of readily available and economical components which are themselves ineffective as catalysts and which are ineffective in combination to polymerize ethylene without activation at temperatures of at least 150° C. The catalyst mixtures of this invention, when activated, are highly effective for polymerizing ethylene and permit the catalytic polymerization to be carried out at temperatures which are well above the maximum temperature which it is ordinarily possible to employ in catalyst systems of somewhat similar types. The polyethylene obtained in accordance with the invention can be molded or extruded into plates or films or extruded in the form of pipe or tubing of greater rigidity than the usual high pressure polyethylene. The polymer can also be in injection molded by the usual techniques into a great variety of articles. The polyethylene can also be cold drawn into ribbons, bands, fibers or filaments of high elasticity and improved rigidity. Fibers of high strength can be spun from the molten polyethylene obtained according to this process. The polymers can also be compounded in the usual manner with pigments, dyes, fillers, stabilizers and the like or blended with other polyethylene such as the conventional low density polyethylene or with other polymeric materials such as are well known in the art.

Although the invention has been described in detail with particular reference to certain preferred embodiments thereof, variations and modifications can be effected within the spirit and scope of the invention as described hereinabove and as defined in the appended claims.

We claim:

1. The method of polymerizing ethylene to solid polymer which comprises contacting ethylene at a pressure of at least 200 p.s.i. and a temperature of 110° to 250° C. in the presence of a catalytic mixture consisting of sodium metal and titanium tetrahalide which has been activated by heating at a temperature of 190°–250° C., the mole ratio of said metal to said titanium tetrahalide being in the range of from 0.1:1 to 10:1.

2. The method of polymerizing ethylene to solid polymer which comprises contacting ethylene at a pressure of at least 200 p.s.i. and a temperature of 110° to 250° C. in the presence of a catalytic mixture consisting of lithium metal and titanium tetrahalide which has been activated by heating at a temperature of 190°–250° C., the mole ratio of said metal to said titanium tetrahalide being in the range of from 0.1:1 to 10:1.

3. The method of polymerizing ethylene to solid polymer which comprises contacting ethylene at a pressure of at least 200 p.s.i. and a temperature of 110° to 250° C. in the presence of a catalytic mixture consisting of potassium metal and titanium tetrahalide which has been activated by heating at a temperature of 150°–250° C., the mole ratio of said metal to said titanium tetrahalide being in the range of from 0.1:1 to 10:1.

4. The method of polymerizing ethylene to solid polymer which comprises heating ethylene at a temperature of 150–250° C. and a pressure of 200–2000 p.s.i. in the presence of a catalytic mixture consisting of sodium metal and titanium tetrachloride in a mole ratio of said metal to said titanium tetrachloride of from 1:1 to 10:1.

5. The method of polymerizing ethylene to solid polymer which comprises heating ethylene at a temperature of 150–250° C. and a pressure of 200–2000 p.s.i. in the presence of a catalytic mixture consisting of lithium metal and titanium tetrachloride in a mole ratio of said metal to said titanium tetrachloride of from 1:1 to 10:1.

6. The method of polymerizing ethylene to solid polymer which comprises heating ethylene at a temperature of 150–250° C. and a pressure of 200–2000 p.s.i. in the presence of a catalytic mixture consisting of potassium metal and titanium tetrachloride in a mole ratio of said metal to said titanium tetrachloride of from 1:1 to 10:1.

7. The method of polymerizing ethylene to solid polymer which comprises contacting ethylene at a pressure of 200–2000 p.s.i. and a temperature of 110°–250° C. in the presence of a catalytic mixture consisting of alkali metal and titanium tetrahalide activated at a temperature of 150°–250° C., the mole ratio of said metal to said titanium tetrahalide being in the range of from 0.1:1 to 10:1, said alkali metal being in the form of a high surface dispersion obtained by slurrying said alkali metal at an elevated temperature with an inert support.

8. The method of polymerizing ethylene to solid polymer which comprises contacting ethylene at a pressure of 200–2000 p.s.i. and a temperature of 150°–250° C. with a catalytic mixture consisting of alkali metal and titanium tetrachloride in a mole ratio of metal to titanium tetrachloride of from 1:1 to 10:1, said alkali metal being in the form of a free-flowing high surface dispersion on an inert particulate support.

9. The method of polymerizing ethylene to solid polymer which comprises contacting ethylene in an inert liquid hydrocarbon vehicle at a temperature of 150°–250° C. and a pressure of 200–2000 p.s.i. with a catalytic mixture consisting of a high surface dispersion of sodium metal on gamma alumina and titanium tetrachloride, the mole ratio of said sodium metal to said titanium tetrachloride being in the range of from 1:1 to 10:1, said sodium metal amounting to not more than 20–25% of the total weight of said alkali metal and said alumina.

10. The method of polymerizing ethylene to solid polymer which comprises contacting ethylene at a pressure of at least 200 p.s.i. and a temperature of 110° to 250° C. in the presence of a catalytic mixture consisting of alkali metal and a hydrocarbon-soluble titanium compound, which mixture has been activated by heating at a temperature of 150–250° C., the mole ratio of said metal to said titanium compound being in the range of from 0.1:1 to 10:1.

11. The method of polymerizing ethylene to solid polymer which comprises contacting ethylene at a pressure of at least 200 p.s.i. and a temperature of 110° to 250° C. in the presence of a catalytic mixture consisting of alkali metal and a hydrocarbon-soluble titanium compound, which mixture has been activated by heating at a temperature of 190°–250° C., the mole ratio of said metal to said titanium compound being in the range of from 0.1:1 to 10:1.

References Cited in the file of this patent

UNITED STATES PATENTS

| | | |
|---|---|---|
| 2,424,083 | Finch et al. | July 15, 1947 |
| 2,427,303 | Reid | Sept. 9, 1947 |
| 2,721,189 | Anderson et al. | Oct. 18, 1955 |
| 2,843,577 | Friedlander et al. | July 15, 1958 |
| 2,879,263 | Anderson et al. | Mar. 24, 1959 |
| 2,881,156 | Pilar | Apr. 7, 1959 |

FOREIGN PATENTS

| | | |
|---|---|---|
| 1,132,506 | France | Nov. 5, 1956 |
| 538,782 | Belgium | Dec. 6, 1955 |